United States Patent
Yoo

(10) Patent No.: US 9,660,562 B2
(45) Date of Patent: May 23, 2017

(54) APPARATUS FOR DETERMINING START OF ELECTRIC MACHINE

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/309,676

(22) Filed: Jun. 19, 2014

(65) Prior Publication Data

US 2015/0008853 A1 Jan. 8, 2015

(30) Foreign Application Priority Data

Jul. 2, 2013 (KR) .................. 10-2013-0076954

(51) Int. Cl.
| H02P 6/16 | (2016.01) |
| H02P 6/20 | (2016.01) |
| H02P 1/26 | (2006.01) |
| H02P 6/18 | (2016.01) |
| H02P 21/18 | (2016.01) |

(52) U.S. Cl.
CPC ............... *H02P 6/20* (2013.01); *H02P 1/265* (2013.01); *H02P 6/18* (2013.01); *H02P 21/18* (2016.02)

(58) Field of Classification Search
USPC .... 318/101, 400.03, 400.09, 400.11, 400.21, 318/778, 400.04
See application file for complete search history.

(56) References Cited

U.S. PATENT DOCUMENTS

| 5,262,709 A * | 11/1993 | Yasuda ............ H02P 8/38 318/696 |
| 6,014,007 A * | 1/2000 | Seibel ............ H02P 21/0032 318/798 |
| 2006/0049795 A1* | 3/2006 | Iura ............ H02P 1/029 318/807 |
| 2013/0106329 A1* | 5/2013 | Kato ............ H02P 21/0032 318/400.11 |
| 2013/0193276 A1* | 8/2013 | Hunter ............ B61L 25/025 246/122 R |

FOREIGN PATENT DOCUMENTS

| CN | 103026612 | 4/2013 |
| JP | 2000-197385 | 7/2000 |
| JP | 2001-054295 | 2/2001 |
| JP | 2002359982 A * | 12/2002 |

(Continued)

OTHER PUBLICATIONS

European Patent Office Application Serial No. 14173425.1, Search Report dated Sep. 8, 2015, 7 pages.

(Continued)

*Primary Examiner* — Eduardo Colon Santana
*Assistant Examiner* — Iftekhar Mustafa
(74) *Attorney, Agent, or Firm* — Lee, Hong, Degerman, Kang & Waimey

(57) ABSTRACT

An apparatus for determining start of electric machine is disclosed wherein a frequency of a 3-phase current inputted from a motor is estimated to determine whether the motor has started using a difference between the estimated frequency and a frequency of output voltage of inverter configured to drive the motor.

3 Claims, 4 Drawing Sheets

(56) References Cited

FOREIGN PATENT DOCUMENTS

| JP | 2004-254424 | 9/2004 |
| JP | 4281376 | 6/2009 |
| JP | 2009-254191 | 10/2009 |

OTHER PUBLICATIONS

Japan Patent Office Application Serial No. 2014-136720, Office Action dated Jun. 22, 2015, 4 pages.
The State Intellectual Property Office of the People's Republic of China Application No. 201410313522.7, Office Action dated May 5, 2016, 6 pages.
State Intellectual Property Office of the People's Republic of China Application Serial No. 201410313522.7, Office Action dated Dec. 28, 2016, 6 pages.

\* cited by examiner

APPARATUS FOR DETERMINING START OF ELECTRIC MACHINE

CROSS-REFERENCE TO RELATED APPLICATIONS

Pursuant to 35 U.S.C. §119 (a), this application claims the benefit of earlier filing date and right of priority to Korean Patent Application No. 10-2013-0076954, filed on Jul. 2, 2013, the contents of which are all hereby incorporated by reference in their entirety.

BACKGROUND OF THE DISCLOSURE

Field

The teachings in accordance with the exemplary embodiments of this present disclosure generally relate to an apparatus for determining start of electric machine.

Background

In general, 3-phase motors such as induction motors and synchronous machines are differentiated in operation methods when with a position sensor and when without a position sensor.

The position sensor such as an encoder and a resolver is frequently used to measure a position and a speed of a rotor, but use of the position sensor disadvantageously increases costs of an entire system, maintenance costs and the volume of the entire system in addition to being weak to fault. In order to overcome these disadvantages, the industries require a demand on sensor-less operation of a 3-phase motor free from a position sensor. However, conventional sensor-less operation of 3-phase motor suffers from failure to determine start of the motor after start of sensor-less operation, which is generated by an error between rotor speed and position estimation.

Particularly, it is difficult to precisely grasp an operation state of a motor in terms of rotor speed and position estimation at a lower speed region of the rotor, making it difficult to determine whether the motor has started successfully.

SUMMARY OF THE DISCLOSURE

The present disclosure is to provide an apparatus for determining start of electric machine configured to determine whether start has successfully made during sensor-less operation of a 3-phase electric machine.

The present disclosure is also to provide an apparatus for determining start of electric machine configured to allow a motor to continuously operate when start has successfully made during sensor-less operation and to stop operating and to re-start when the motor has failed to start.

In one general aspect of the present disclosure, there is provided an apparatus for determining start of electric machine, comprising:
- a converter configured to output a first AC (Alternating Current) signal corresponding to a frequency component of at least one phase current inputted from an inverter to a 3-phase motor and a second AC signal 90 degree lagged in phase angle from the first AC signal;
- an estimator configured to estimate a frequency from the second AC signal; and
- a determinator configured to determine whether the 3-phase motor has started using a difference between the frequency estimated by the estimator and a frequency of an output voltage of the inverter.

Preferably, but not necessarily, the apparatus may further comprise a bandwidth decision unit configured to decide a control bandwidth of the estimator.

Preferably, but not necessarily, a control bandwidth decided by the bandwidth decision unit may be decided by a gain of the estimator.

Preferably, but not necessarily, the gain of the estimator may be selected of a value higher than an operation frequency of the 3-phase motor.

Preferably, but not necessarily, the estimator may receive a positive input frequency inoperable by the motor to output the input frequency when start of the motor is not made and to determine whether the start of the motor has successfully made.

Preferably, but not necessarily, the determinator may determine that the start has failed when a difference between the frequency estimated by the estimator and the frequency of output voltage of the inverter.

Advantageous Effects of the Disclosure

The present disclosure thus discussed has an advantageous effect in that a frequency of a phase current inputted into a 3-phase motor during sensor-less operation of the motor is estimated to determine whether the motor has successfully started by comparing the frequency of the phase current with a frequency of an output voltage of an inverter configured to control the motor.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Now, an exemplary embodiment of the present disclosure will be described in detail with reference to the accompanying drawings.

Figure 1:
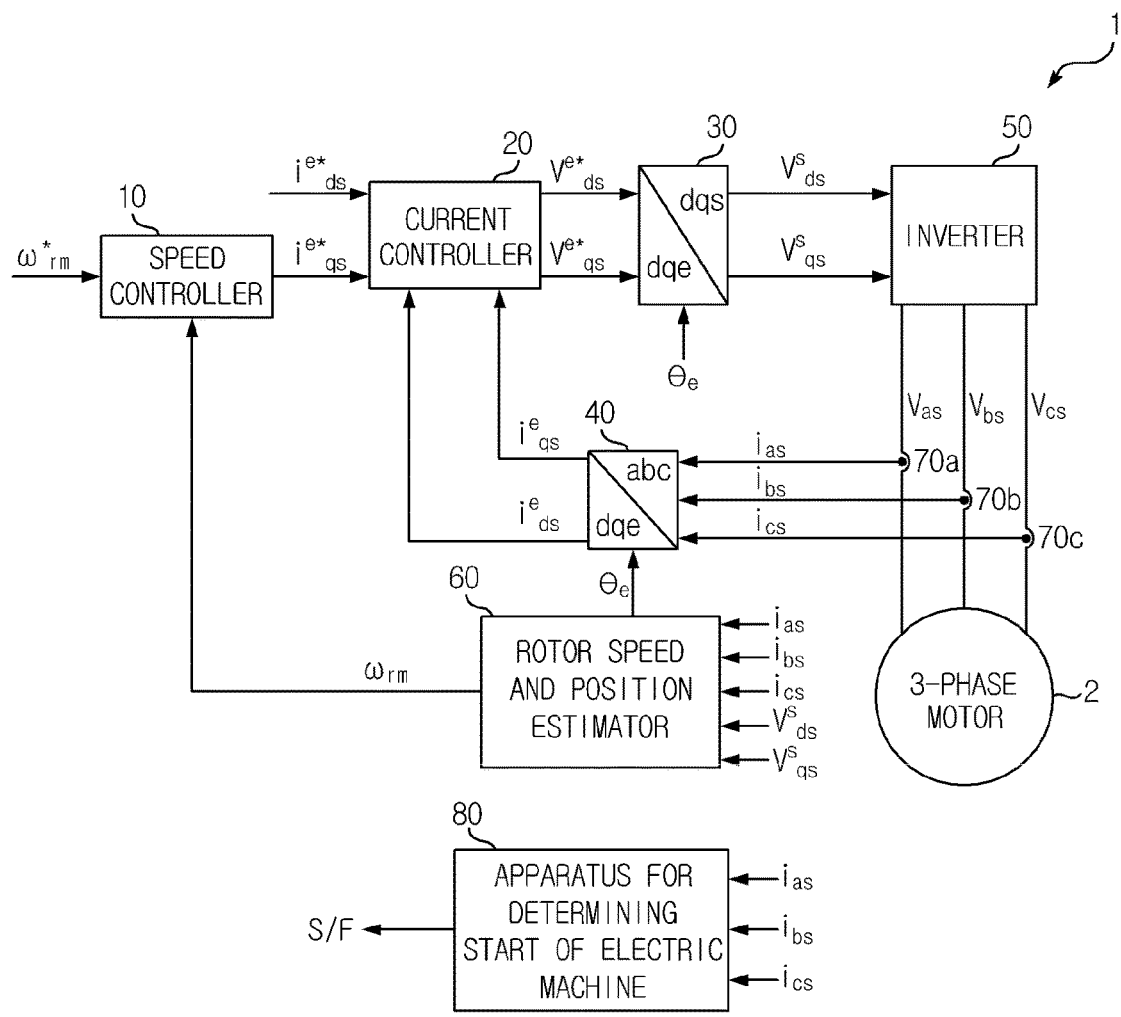
FIG. 1 is a block diagram illustrating a motor control system according to the present disclosure.

FIG. 1 is a block diagram illustrating a motor control system according to the present disclosure, where the motor control system (1) according to an exemplary embodiment of the present disclosure operates a 3-phase motor (2), and where the motor (2) may be an induction motor or a synchronous motor, for example.

Referring to FIG. 1, the motor control system (1) according to the present disclosure may include a speed controller (10), a current controller (20), a first converter (30), a second converter (40), an inverter (50), a rotor speed and position estimator (60), a current measurer (70: 70a, 70b, 70c) and an apparatus (80) for determining start of electric machine, where the apparatus (80) for determining start of electric machine (hereinafter referred to as apparatus) in the control system (1) of the present disclosure determines whether the start of the motor (2) is successful and transmits the determination to a higher level controller (not shown).

The speed controller (10) uses a rotor speed command and an actual rotor speed as input and outputs a q-axis current command on a synchronous reference frame. The current controller (20) outputs d, q voltages of the synchronous reference frame from d, q axis current command of the synchronous reference frame and an actual current. The first converter (30) converts an output voltage of the current controller (20) to a voltage on a stationary reference frame. The second converter (40) converts a phase current of the motor (2) measured by the current measurer (70) to d, q axis current on the synchronous reference frame. The inverter (50) applies a voltage to the motor (2) and the rotor speed and position estimator (60) uses the phase current measured by the current measurer (70) and the output voltage of the first converter (30) as input to estimate a rotor speed and a rotor position. The current measurer (70) measures a phase current inputted from the motor (2).

The apparatus (80) may output 'S' when start of the motor (2) is successful, and output 'F' when the start of the motor (2) is unsuccessful, and may transmit the output to a higher controller (not shown). The apparatus (80) may additionally output a signal for restart. Now, each component will be described in detail.

Figure 2:
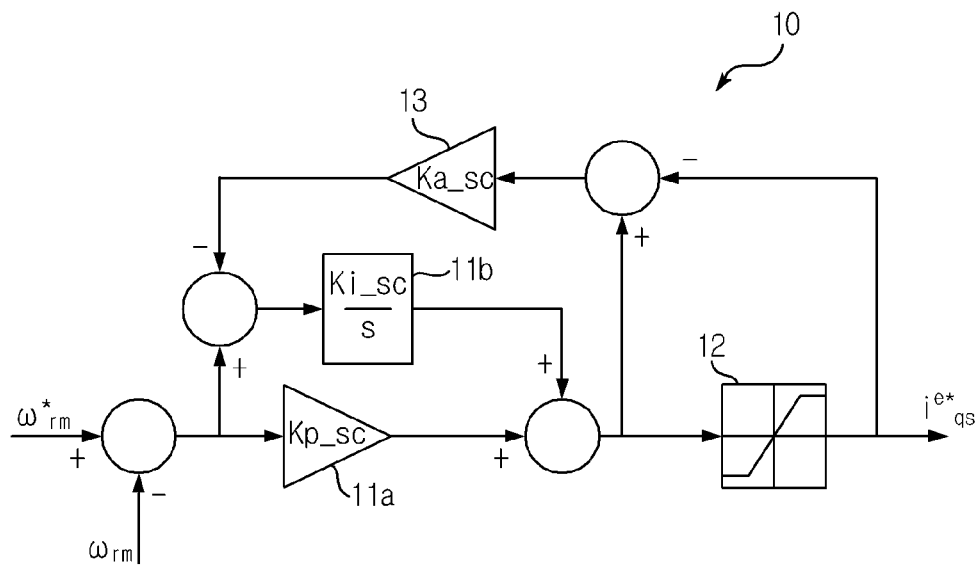
FIG. 2 is a detailed block diagram illustrating a speed controller of FIG. 1.

FIG. 2 is a detailed block diagram illustrating a speed controller (10) of FIG. 1.

Referring to FIG. 2, the speed controller (10) according to the present disclosure outputs a q-axis current command according to a difference between a speed reference and a feedback speed using proportional and integral control. The speed controller (10) according to the present disclosure may include proportional and integral controllers (11a, 11b), a limiter (12) and an anti-windup gain setting unit (13), where the limiter (12) limits an output of the speed controller (10) and the gain setting unit (13) serves to prevent divergence of the integral controller (11b) when the limiter (12) operates. An output of the speed controller (10) becomes a q-axis current on the synchronous reference frame.

Figure 3A:
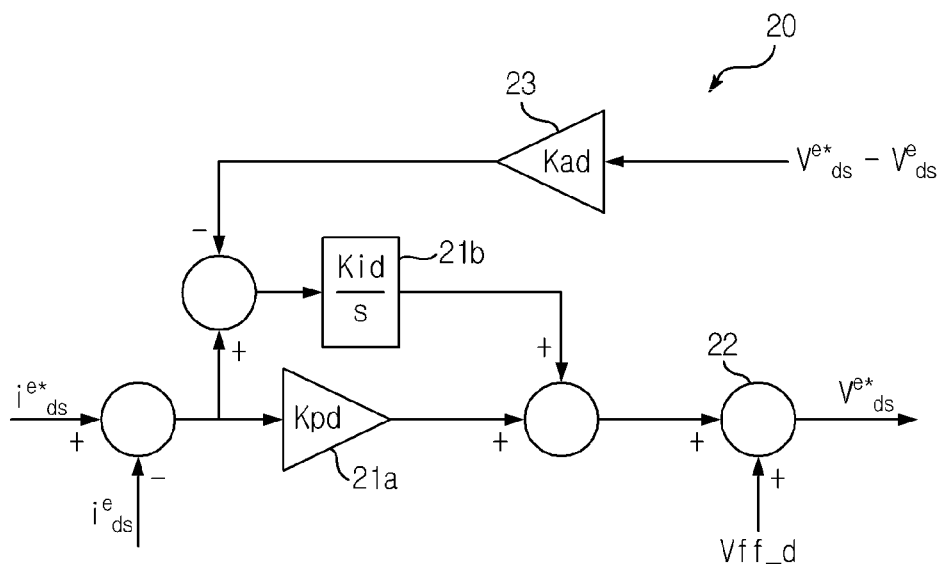
FIGS. 3a and 3b are detailed block diagrams illustrating a current controller of FIG. 1.
Figure 3B:
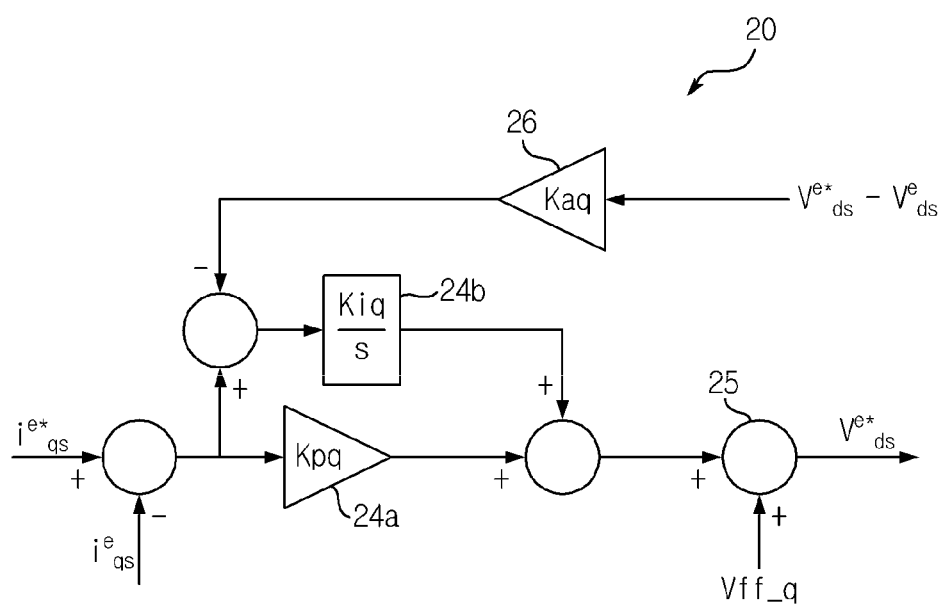

FIGS. 3a and 3b are detailed block diagrams illustrating a current controller (20) of FIG. 1, where FIG. 3a is a configuration of a d-axis current controller of the synchronous reference frame, and FIG. 3b is a configuration of q-axis current controller on the synchronous reference frame.

Referring to FIGS. 3a and 3b, the d, q axis current controller may include a proportional and integral controller for respectively controlling d, q axis currents on the synchronous reference frame and a feed-forward. That is, the current controller (20) of the present disclosure includes proportional and integral controllers (21a, 21b, 24a, 24b) configured to control a current from a current command and a feedback current, feed-forwards (22, 25) and anti-windup gain setting units (23, 26).

The feed-forwards (22, 25) may variably be configured according to modeling of the 3-phase motor (2). Furthermore, the gain setting units (23, 26) serve to prevent divergence of the integral controllers (21b, 24b) when an output of the current controller (20) deviates the size of voltage synthesizable by the inverter (50).

The first converter (30) of FIG. 1 converts the voltage on the synchronous reference frame which is an output of the current controller (20) to a voltage on the stationary reference frame, and outputs an output as expressed by the following Equations.

$$V_{ds}^{s} = V_{ds}^{e*} \cos \theta_e - V_{qs}^{e*} \sin \theta_e$$

$$V_{ds}^{s} = V_{ds}^{e*} \sin \theta_e - V_{qs}^{e*} \cos \theta_e$$

Furthermore, the second converter (20) outputs d, q axis current on the synchronous reference frame from the phase current of the motor (2) received from the current measurer (70) according to the following Equations.

$$i_{ds}^{s} = \frac{2i_{as} - i_{bs} - i_{cs}}{3} \quad \text{[Equation 3]}$$

$$i_{qs}^{s} = \frac{i_{bs} - i_{cs}}{\sqrt{3}} \quad \text{[Equation 4]}$$

$$i_{ds}^{e} = i_{ds}^{s} \cos\theta_e + i_{qs}^{s} \sin\theta_e \quad \text{[Equation 5]}$$

$$i_{qs}^{e} = -i_{ds}^{s} \sin\theta_e + i_{qs}^{s} \cos\theta_e \quad \text{[Equation 6]}$$

The rotor speed and positions estimator (60) uses the current inputted from the motor (2) and the voltage inputted from the inverter (50) as inputs to output a rotor speed and a rotor flux position, the detailed configuration of which is well known to the skilled in the art such that no further elaboration thereto will be made.

The apparatus (80) in FIG. 1 determines the start of the motor (2) using a frequency of current inputted from the motor (2). Although FIG. 1 illustrates that the apparatus (80) receives all input currents of the motor (2) from the current measurer (70), the apparatus (80) may receive one or two currents.

Now, the apparatus of the present disclosure will be described in detail with reference to FIG. 4.

Figure 4:
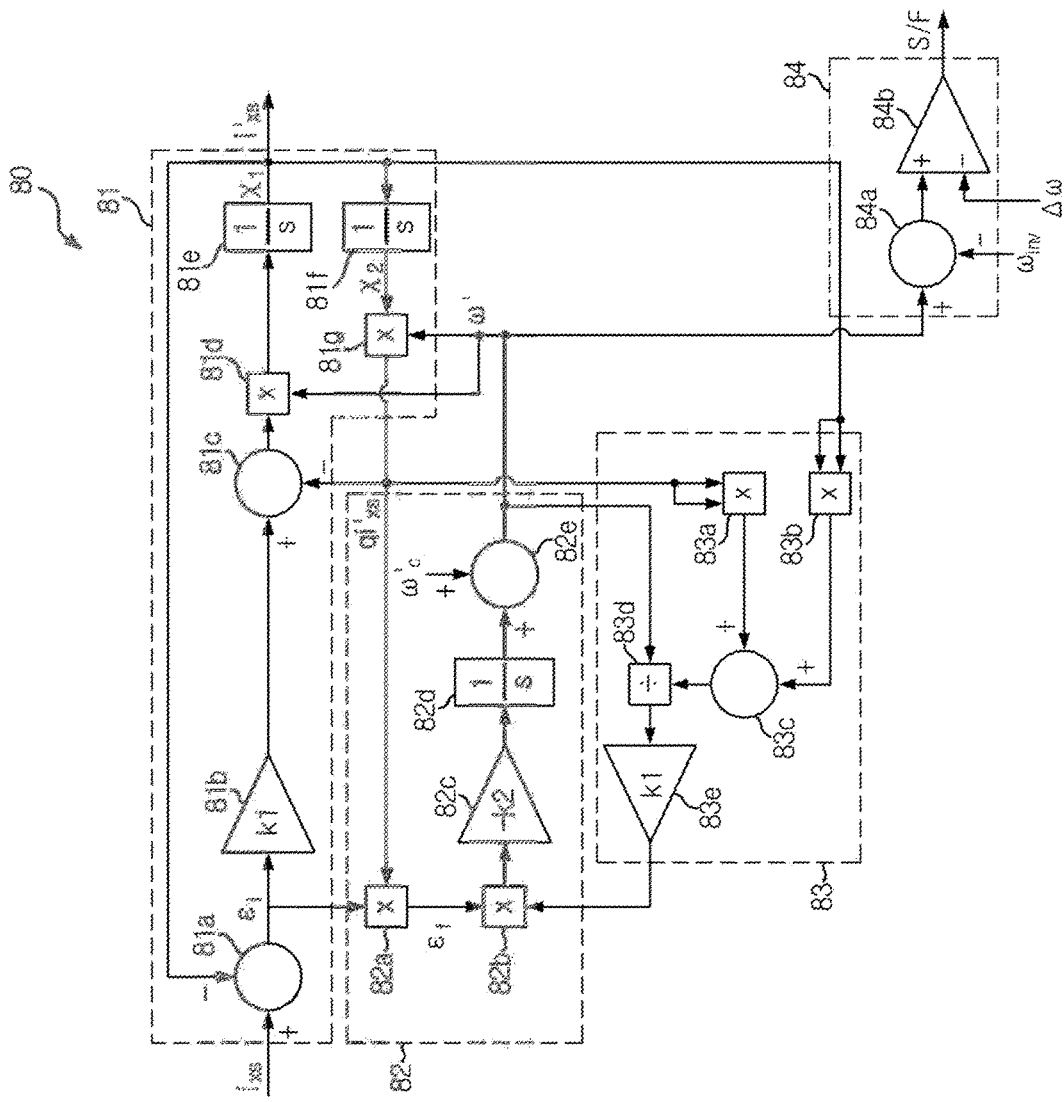
FIG. 4 is a detailed block diagram illustrating an apparatus for determining start of electric machine.

FIG. 4 is a detailed block diagram illustrating an apparatus for determining start of electric machine.

Referring to FIG. 4, the apparatus (80) of the present disclosure may include a current converter (81), a frequency estimator (82), a bandwidth decision unit (83) and a determinator (84).

The current converter (81) generates a signal $qi'_{xs}$, lagging in phase angle by 90 degrees from AC signals $i'_{xs}$ and $i'_{xs}$ corresponding to frequency applied by the inverter (50) from phase current (x=a, b, c) inputted from the motor (2), and includes a deductor (81a), a gain setting unit (81b), a deductor (81c), a multiplier (81d), an integrator (81e), an integrator (81f) and a multiplier (81g).

The frequency estimator (82) estimates a frequency of phase current inputted from the motor (2), and includes deductors (82a, 82b), a gain setting unit (82c), an integrator (82d) and adder (82e).

The bandwidth decision unit (83) decides a control bandwidth of the frequency estimator (82), and includes multipliers (83a, 83b), an adder (83c), a divider (83d) and a gain setting unit (83e).

The determinator (84) uses the output of the frequency estimator (82) of the motor (2) to determine whether start has been successful, and includes a deductor (84a) and a decision unit (84b).

Now, operation of the apparatus (80) will be described in detail.

When a frequency of phase current inputted from the motor (2) is ω', the current converter (81) may decide $i'_{xs}$ and $qi'_{xs}$ using the following Equations.

$$D(S) = \frac{i'_{xs}(s)}{i_{xs}(s)} \quad \text{[Equation 7]}$$

$$= \frac{k_1 \omega' s}{s^2 + k_1 \omega' s + \omega'^2}$$

$$Q(S) = \frac{qi'_{xs}(s)}{i_{xs}(s)} \quad \text{[Equation 8]}$$

$$= \frac{k_1 \omega' s}{s^2 + k_1 \omega' s + \omega'^2}$$

Only frequency component of $\omega'$ may be extracted from the measured phase current of motor (2) from Equation 7, and a signal lagged in phase by 90 degrees from the component decided by Equation 7 can be decided by Equation 8.

The frequency estimator (82) detects a frequency of phase current inputted to the motor (2), where $x_1$, $x_2$ which are outputs of integrators (81e, 81f) may be first decided by the current converter (81) according to the following Equations respectively.

$$\dot{x} = \begin{bmatrix} \dot{x}_1 \\ \dot{x}_2 \end{bmatrix} \quad \text{[Equation 8]}$$

$$= Ax + Bv$$

$$= \begin{bmatrix} -k_1 \omega' & -\omega'^2 \\ 1 & 0 \end{bmatrix} \begin{bmatrix} x_1 \\ x_2 \end{bmatrix} + \begin{bmatrix} k_1 \omega' \\ 0 \end{bmatrix} i_{xs}$$

$$y = \begin{bmatrix} i'_{xs} \\ qi'_{xs} \end{bmatrix} \quad \text{[Equation 9]}$$

$$= Cx$$

$$= \begin{bmatrix} 1 & 0 \\ 0 & \omega' \end{bmatrix} \begin{bmatrix} x_1 \\ x_2 \end{bmatrix}$$

At this time, when relationship is as per the following Equation 10, a normal state may have the condition as per the following Equation 11.

$$\dot{\omega}' = -k_2 x_2 \omega'(i_{xs} - x_1) \quad \text{[Equation 10]}$$

$$\dot{\omega}' = 0$$

$$\omega = \omega'$$

$$x_1 = i_{xs} \quad \text{[Equation 11]}$$

Equation 8 may be defined in the following manner using the condition of Equation 11.

$$\dot{x}|_{\dot{\omega}'=0} = \begin{bmatrix} \dot{\bar{x}}_1 \\ \dot{\bar{x}}_2 \end{bmatrix} \quad \text{[Equation 12]}$$

$$= \begin{bmatrix} 0 & -\omega'^2 \\ 1 & 0 \end{bmatrix} \begin{bmatrix} \bar{x}_1 \\ \bar{x}_2 \end{bmatrix}$$

The following relationship may be decided by defining the Equation 12.

$$\ddot{\bar{x}}_1 = -\omega^2 \bar{x}_2 \quad \text{[Equation 13]}$$

Next, operation of bandwidth decision unit (83) will be described.

The following Equations may be derived when average of each variable is used.

$$\bar{\varepsilon}_i = i_{xs} - \bar{x}_1 \quad \text{[Equation 14]}$$

$$= \frac{1}{k_1 \omega'}(\ddot{\bar{x}}_1 + \omega'^2 \bar{x}_2)$$

$$\bar{\varepsilon}_f = \omega' \bar{x}_2 \bar{\varepsilon}_i \quad \text{[Equation 15]}$$

$$= \frac{\bar{x}_2^2}{k_1}(\omega'^2 - \omega^2)$$

$\omega'^2 - \omega^2$ in Equation 15 may be simplified as $2\omega'(\omega' - \omega)(@\omega' \cong \omega)$, and therefore, an estimated frequency of the bandwidth decision unit (83) may be decided to have the following control bandwidth.

$$\frac{\bar{\omega}'}{\omega} = \frac{k_2}{s + k_2} \quad \text{[Equation 16]}$$

Thus, with reference to Equation 16, it can be appreciated that the control bandwidth is decided by gain of the gain setting unit (82c) of the frequency estimator (82). Thus, the gain of the gain setting unit (82c) is preferably selected of a value higher than an operation frequency of the motor (2).

The deductor (84a) of determinator (84) outputs a difference between $\omega'$ a frequency of estimated current which is an output of the frequency estimator (82) and $\omega_{INCV}$ a frequency of voltage outputted by the inverter (50), and the decision unit (84b) outputs 'F' as being determined as failure in start when the difference of the deductor (84a) exceeds $\Delta\omega$ which is a preset allowable frequency scope, and outputs 'S' as being determined as success of start when the difference is within the preset allowable frequency scope.

When the sensor-less operation of 3-phase motor (2) is normal, a current frequency which is the same as the frequency of voltage applied by the inverter (50) must be outputted. At this time, the frequency $\omega 1$ of voltage applied by the inverter (50) is a variable known by the higher controller (not shown), the frequency $\omega'$ of phase current inputted to the motor (2) estimated by the frequency estimator (82) during normal operation must be same ($\omega 1 = \omega'$). That is, when an output of the frequency estimator (82) is same as an output voltage frequency of the inverter (50), it means that the 3-phase motor (2) operates normally, and when the value is different, it means that the 3-phase motor (2) is determined as having developed a problem on the sensor-less operation, such that the higher controller stops the operation and may restart.

At this time, when the input $\omega'_c$ of the frequency estimator (82) is selected as an amount of value inoperable by the motor (2), and when the start of the motor (2) is not realized, the output of the frequency estimator (82) becomes $\omega'_c$ to easily determine whether the motor (2) has successfully started.

As noted from the foregoing, the apparatus (80) can measure all three currents inputted to the motor (2), or measure one or two currents, where the higher controller determines that the start of the motor (2) has failed when 'S' is not outputted from all currents.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for determining start of an electric machine, the apparatus comprising:
- a current converter configured to output a first AC (Alternating Current) signal corresponding to a frequency component of at least one phase current input to a 3-phase motor from an inverter and to output a second AC signal having a phase angle that lags a phase angle of the first AC signal by 90°;
- an estimator configured to estimate a frequency of the second AC signal;
- a bandwidth decision unit configured to determine a control bandwidth of the estimated frequency estimated by the estimator; and
- a determiner configured to determine whether the 3-phase motor has started according to a difference between the estimated frequency and a frequency of an output voltage of the inverter,
- wherein the control bandwidth is determined according to a gain of the estimator, and
- wherein the gain of the estimator is selected as a value higher than an operation frequency of the 3-phase motor.

2. The apparatus of claim 1, wherein the estimator receives a positive inoperable input frequency of the motor and outputs the received frequency when start of the motor is not determined in order to determine whether the motor has successfully started.

3. The apparatus of claim 1, wherein the determiner determines that the motor has not started when the difference between the estimated frequency and the frequency of the output voltage of the inverter exceeds a preset frequency range.

* * * * *